(12) United States Patent
Wendt

(10) Patent No.: US 6,993,713 B2
(45) Date of Patent: Jan. 31, 2006

(54) WEB CONTENT MANAGEMENT SOFTWARE UTILIZING A WORKSPACE AWARE JSP SERVLET

(75) Inventor: David Wendt, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 621 days.

(21) Appl. No.: 10/163,470

(22) Filed: Jun. 6, 2002

(65) Prior Publication Data

US 2003/0229849 A1 Dec. 11, 2003

(51) Int. Cl.
*G06F 15/00* (2006.01)
*G06F 17/00* (2006.01)
*G06F 17/21* (2006.01)
*G06F 17/24* (2006.01)

(52) U.S. Cl. .................. 715/513; 715/500; 715/523; 715/522; 715/530

(58) Field of Classification Search ............... 715/500, 715/513, 530, 531
See application file for complete search history.

(56) References Cited

U.S. PATENT DOCUMENTS

| | | | | |
|---|---|---|---|---|
| 6,085,198 | A | * 7/2000 | Skinner et al. | 707/103 R |
| 6,151,609 | A | * 11/2000 | Truong | 715/505 |
| 6,253,193 | B1 | * 6/2001 | Ginter et al. | 705/57 |
| 6,327,628 | B1 | * 12/2001 | Anuff et al. | 719/311 |
| 6,332,163 | B1 | * 12/2001 | Bowman-Amuah | 709/231 |
| 6,349,327 | B1 | * 2/2002 | Tang et al. | 709/205 |
| 6,571,282 | B1 | * 5/2003 | Bowman-Amuah | 709/219 |
| 6,662,237 | B1 | * 12/2003 | Leckie | 719/320 |
| 6,675,205 | B2 | * 1/2004 | Meadway et al. | 709/219 |
| 6,728,769 | B1 | * 4/2004 | Hoffmann | 709/225 |
| 6,766,350 | B1 | * 7/2004 | Moreau | 709/200 |
| 6,772,216 | B1 | * 8/2004 | Ankireddipally et al. | 709/230 |
| 6,772,408 | B1 | * 8/2004 | Velonis et al. | 717/100 |
| 6,799,718 | B2 | * 10/2004 | Chan et al. | 235/375 |
| 6,810,429 | B1 | * 10/2004 | Walsh et al. | 709/246 |
| 2001/0047402 | A1 | * 11/2001 | Saimi et al. | 709/219 |
| 2002/0138582 | A1 | * 9/2002 | Chandra et al. | 709/206 |

OTHER PUBLICATIONS

Kettell, Jennifer A.; Dreamweaver 4: The Complete Reference; May 1, 2001; McGraw Hill companies; paperback; 21, 91, 164–5, 174–5, 721–5.*
Hallo gram; Dreamwaver Ultradev; 2000; Hallo gram Publishing.*
Hallo gram; JBuilders; 2001; Hallogram Publishing.*
Sun Microsystems, Inc.; The NetBeans API, A Developer's Guide; Sep. 2000; Sun MicroSystems, Inc.*

* cited by examiner

*Primary Examiner*—Joseph Feild
*Assistant Examiner*—N. Hillery
(74) *Attorney, Agent, or Firm*—Synnestvedt & Lechner LLP; Martin McKinley, Esq.

(57) ABSTRACT

The present invention is a method, system, and computer program product for editing dynamic web content. In accordance with the present invention, dynamic web content, such as JSP files, can be edited using the concept of workspaces. This allows a dynamic content file to be edited without affecting its associated web site during the editing process. A dynamic content file, such as JSP file, is edited or updated within a workspace, while the original dynamic content file remains available to users outside of the workspace.

13 Claims, 3 Drawing Sheets

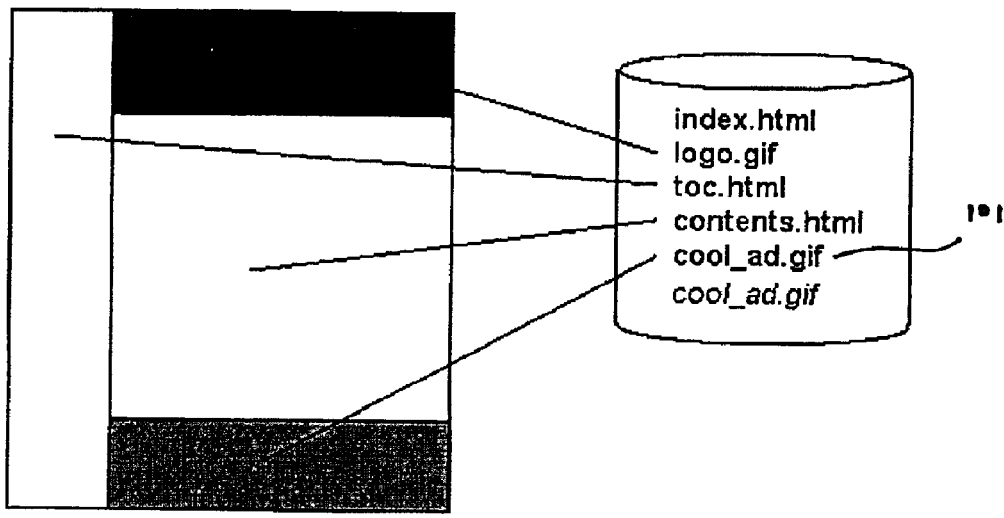
Figure 1a - Prior Art
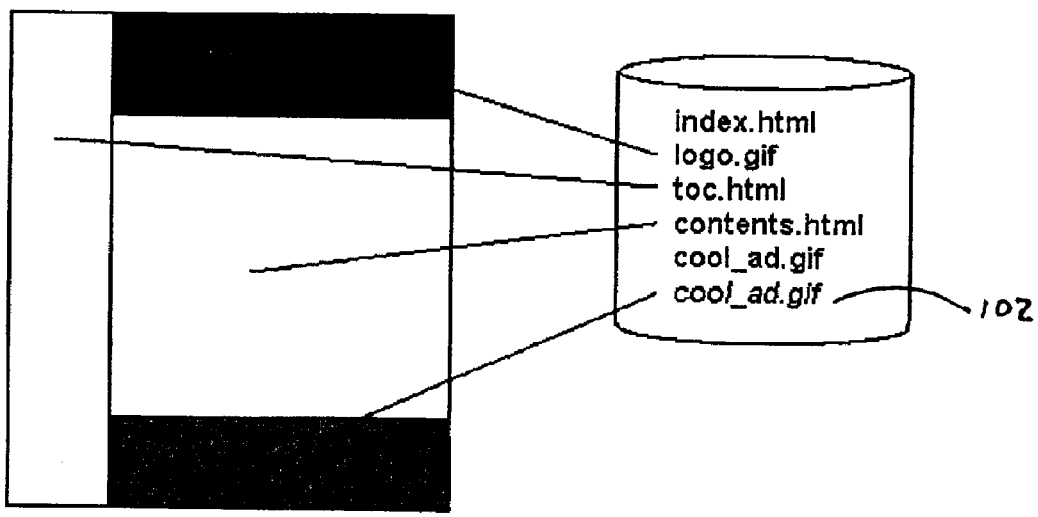
Figure 1b - Prior Art

| Source file | full class name | class file |
|---|---|---|
| index.jsp | job1.index | base/index.class |
| page1/contents.jsp | job1.page1.contents | base/page1/contents.class |
| page1/welcome.jsp | job1.page1.welcome | job1/page1/welcome.class |

Figure 2a

| Source file | full class name | class file |
|---|---|---|
| index.jsp | job2.index | base/index.class |
| page1/contents.jsp | job2.page1.contents | base/page1/contents.class |
| page1/welcome.jsp | job2.page1.welcome | base/page1/welcome.class |

Figure 2b

WEB CONTENT MANAGEMENT SOFTWARE UTILIZING A WORKSPACE AWARE JSP SERVLET

FIELD OF THE INVENTION

The present invention relates to computer resource sharing. More particularly, it deals with sharing dynamic web page files between several web content developers.

BACKGROUND OF THE INVENTION

The past several years have brought drastic changes to the computer field. Many of these changes are as a result of the rapid growth of the Internet, or World Wide Web. The Internet is a vast collection of computing resources, interconnected as a network, available all over the world. It is used daily by millions of people. The World Wide Web (hereinafter the "Web") is that portion of the Internet that uses the HyperText Transfer Protocol (HTTP) as a protocol for exchanging messages.

A computer user working in a Web environment uses a web browser or other known software that enables the creation and sending of requests for information over the web and allows the responses to these requests to be viewed. These functions are typically combined in what is referred to as a "Web browser", or "browser." After the user has created a request using the browser, the request message is sent out over the Internet to a target computer for processing. The target computer is one of the interconnected computers in the Internet network. The target computer will receive the message, attempt to find the data satisfying the user's request, format that data for display with the user's browser, and return the formatted response to the browser software running on the user's computer. The data returned to the user can be a "web page", which is one of the many files located on the server.

When web pages were first developed, they originally comprised a single file which displayed the content of the web page to the user. However, as the Internet has advanced, "web sites" were developed which comprised many files or pages grouped together. Web sites have become increasingly more complex as the use of the Internet has increased. Web sites today consist of many files of many types which together form the complete web site.

In the past, small web sites were often managed by a single administrator or webmaster. The webmaster would update the content on the web site by editing the content files and posting the updated files to the web site in place of the existing files. However, today, very large web sites exist that contain a large number of files. Often, these sites are not maintained by a single webmaster. Instead, an entire team of individuals may all be updating portions of the web site simultaneously.

This created an entirely new set of concerns. With many programmers working on a web site simultaneously, resource sharing became an issue. One programmer might be working on a particular file for a web site, and a different programmer might need to use this same file in conjunction with a file or page he or she is editing. In addition, the complexity of the editing process might mean that a programmer would be working on a particular file for an extended length of time, rendering the file inaccessible for the entire time the file was being edited or updated.

To overcome these concerns, web content management software has been developed. Web content management software packages aid programmers in editing and updating the content of a web site. These packages use the concept of a "sandbox" or "workspace" to aid programmers in working on files contained on a web site. A workspace is a virtual area assigned to a particular developer or set of developers. A workspace can exist on the local computer from which the developer is accessing the site, or alternatively, it can be a designated area within the server itself. A developer can place a copy of a file in the workspace in order to update or edit it, while the original file remains available to users of the site, or to other developers. In other words, the programmer creates a "working copy" that is used for editing. The file that is being edited or updated remains in the programmer's workspace until the work being performed on it is complete, at which time the programmer replaces the existing file on the web site with the new file. The replacement process is known as "promoting" the updated file to the web site.

A web page comprising five files (index.html, logo.gif, toc.html, contents.html, cool_ad.gif) is shown in FIG. 1a and FIG. 1b. When programmer desires to update the file entitled "cool_ad.gif 101", a copy of this file is created (e.g., "cool_ad.gif" 102) and placed in a workspace. Users accessing the page see the entire page including the original "cool_ad.gif" 101 as shown in FIG. 1a. The programmer (or group of programmers) working in the newly created workspace see the original "index.html," "logo.gif," "toc.html", and "contents.html" files; however, within the workspace the new edited "cool_ad.gif" 102 file appears, as shown in FIG. 1b. Once the programmers have completed their work on "cool_ad.gif" 102, the new file is promoted to the base web site and replaces the original "cool_ad.gif" 101. FIG. 1a and FIG. 1b illustrate the differences between what the user or users working within a workspace see as opposed to a user accessing the site from outside the workspace The technique of using workspaces enabled several developers to work on a large web site simultaneously without interfering with each other or with other users of the site. It also allowed for an organizational structure to be applied to web development. This means a junior programmer could edit a file within his workspace which could then be transferred to his supervisor's workspace for review before being promoted to the web site. During the time elapsed before this process is complete, other programmers and users would still have access to the original file on the web site.

The concept of workspaces worked well as long as the content of the web site that was being edited was static content (images, logos, data, etc.). However, as the field of web site development grew, so did the complexity of the sites. Dynamic web content became prevalent on web sites. Dynamic web content consists of interactive and/or frequently changing web content such as animated GIFs, stock tickers, streaming videos, weather maps, and the like. In addition, the Java Server Page (JSP) was developed. JSPs contain Java and HTML source code, which is compiled into a Java class file and executed using a JSP servlet running on the web server. The code contained within the JSP is used to modify the web page before it is sent to the user. A JSP allows a page to adjust dynamically to the request from a user, such that different users could see different content from accessing the same URL. For example, the JSP might recognize a request from a particular user, determine from the user profile that the user is named Tom, and return a page beginning with the message "Hello Tom."

Dynamic web content cannot be edited using the prior art system of workspace allocation. JSPs are normally compiled into a unique Java class and executed by the application server when required. The generated Java class is loaded into a ClassLoader, which identifies the class by its unique name. When referenced, the ClassLoader returns the appropriate Java byte-code (executable code) for the generated class. The class file is matched to the path and filename in the system. For example, a Java class named "theClass" within an application such as IBM's WebSphere could have a fully-qualified Java class name of "com.ibm.websphere.TheClass." Once resolved by the application server, the class file created would be "com/ibm/websphere/TheClass.class" where the path and filename are matched to the package/name of the JSP. As a result of this method of identification, JSP files are unable to be edited in a workspace environment. In a workspace environment, the ClassLoader would need to return different executable code for the same class name (i.e., one when called from within the workspace and a second one when called from outside of the workspace). The first request would cause the first loaded class to be returned, but a second class request would yield unpredictable results, because of a name conflict. This would not necessarily cause an error, but the results would be unpredictable because the JSP output would be generated from executing the wrong version of the class.

Accordingly, it is desired to be able to edit and update dynamic content files, such as JSP files, in a workspace environment without experiencing the conflicts described above. It is further desired to be able to perform JSP editing that is subject to the organizational structure used with static content, thus, assuring high levels of quality and security.

SUMMARY OF THE INVENTION

The present invention is a method, system, and computer program product for editing dynamic web content. In accordance with the present invention, dynamic web content, such as JSP files, can be edited using the concept of workspaces. This allows a dynamic content file to be edited without affecting its associated web site during the editing process. A dynamic content file, such as JSP file, is edited or updated within a workspace, while the original dynamic content file remains available to users outside of the workspace.

In accordance with a preferred embodiment, the JSP file contents of a file subject to editing are allocated to a workspace. In a preferred embodiment, the files on a web site are serviced using a file database, and the subject file is allocated to a workspace by creating an additional entry in the file database. A JSP servlet compiles the JSP file from the database into a class file. The class file is then loaded by the class loader. The class file is invoked through the JSP servlet whenever the JSP is requested by the browser.

The segregation into a workspace is achieved by assigning a workspace specific package to the class. A workspace specific path name is assigned to the class (.class) file. The path of the .class file is dependent upon the actual workspace location of the JSP file in the database. Thus, a JSP source file with the extension .jsp is compiled into a Java class file with the file extension .class. If the JSP source file is not located in a workspace, the .class file is compiled to a "base" path. Otherwise, the workspace name is used to create a path for the .class file. For example, a JSP source file such as "index.jsp" that is being used in a workspace entitled WS1 would be given a class name package of "WS1.index." The class file for "WS1.index" would be found in "base/index.class" or "WS1/index.class", depending on the workspace location of the "index.jsp" source. If "index.jsp" is not in WS1, then the bytecodes for class "WS1.index" would be read from the file "base/index.class." If "index.jsp" is in WS1, then the bytecodes for class "WS1.index" would be read from the file "WS1/index.class."

Upon completion and approval of any changes to the workspace specific JSP file, the changes are promoted to the database and the file versions associated with a particular workspace are deleted.

BRIEF DESCRIPTION OF THE DRAWINGS

FIG. 1a is a diagram showing a web page with embedded files, in accordance with the prior art.

FIG. 1b is a diagram showing a web page with embedded files as viewed by a user working within a workspace, in accordance with the prior art.

FIG. 2a is a table of JSP files along with the respective associated full class names and class files within a sample workspace.

FIG. 2b is a table of JSP files along with the respective associated full class names and class files outside of the sample workspace.

DETAILED DESCRIPTION OF THE INVENTION

Figure 3A:
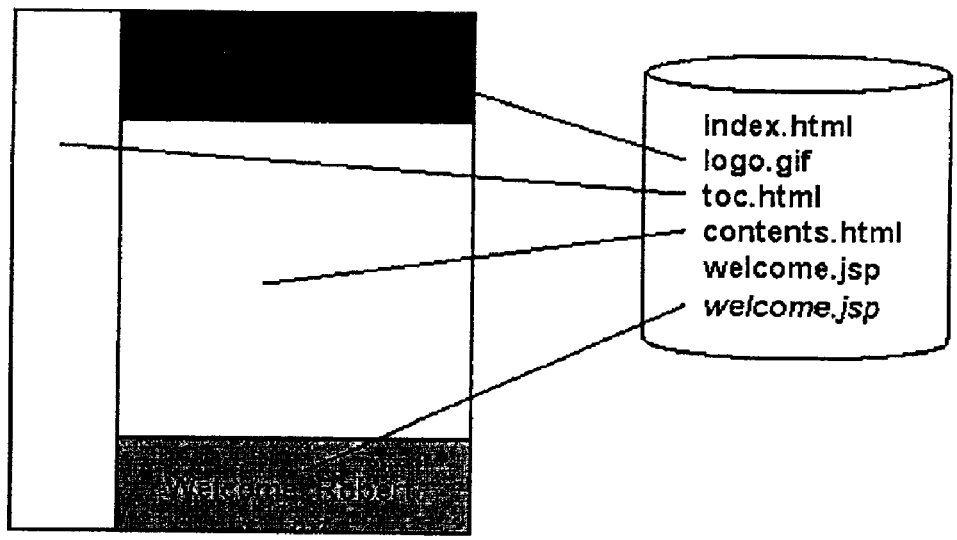
FIG. 3a is a browser view of the web page as seen by a programmer working within the sample workspace.

The present invention described herein is a web content management solution that allows for active web content such as a Java Server Page to be edited within a workspace without removing the ability of users of the web site to access the active web content during the editing or updating process.

In a preferred embodiment, file data content is contained within a database structure for a given web site. This type of file architecture allows for easy implementation of workspaces, allowing a programmer to edit a file within a workspace without affecting the original or base file content. Alternative embodiments include complex file directory structures, which also include partitioning for workspaces. In accordance with the present invention, a file servlet allows the programmer to view the entire web site using a browser, with the static web content displayed being the edited file from his or her workspace along with the unchanged content retrieved from the base site. The servlet reads the file contents from a database based upon the workspace information in the session, and displays the edited files from the workspace in conjunction with the remaining files from the base web site.

In accordance with the present invention, dynamic content can also be handled in this fashion. For dynamic web content such as JSPs, a servlet (hereinafter referred to as the JSP servlet) compiles the JSP file into a Java servlet class (.class file). This class file is then loaded by the class loader. When the JSP is requested by a browser, the class .file is invoked via the JSP servlet.

The JSP servlet generates file paths for the class files based upon the relative location of the JSP files with respect to the base web site file locations, otherwise known as the web module's root. An example of this is illustrated in the tables shown in FIG. 2a and FIG. 2b. An exemplary web site contains a web page (page 1) utilizing three JSP files: "index.jsp" 201, "contents.jsp" 205, "welcome.jsp" 207. The source files for these three files are "index.jsp", "page1/contents.jsp", and "page1/welcome.jsp", respectively. In this example, the file "welcome.jsp" is responsible for the recognizing the identity of the user and presenting a welcome message on the screen of a user's computer when the site is accessed via a web browser. In order for a programmer to edit the manner in which this is done, "welcome.jsp" needs to be modified. For example, the existing file might present a formal greeting such as "Welcome, Robert" and a programmer may desire to edit the file to use a less formal greeting such as "Hello Bob!" The programmer editing "welcome.jsp" works within a workspace, as would be the case for static content. The JSP servlet compiles "welcome.jsp" into a class file (with a .class extension). The .class file is added to the workspace in use by the programmer. In the example shown in FIG. 2a and FIG. 2b, the workspace created is entitled "job1." A class name is created for the respective JSP files with reference to the workspace "job1" (i.e., "job1.index" 209, "job1.page1.contents" 211, "job1.page1.welcome" 213). To edit the welcome file, a class file is built and assigned the class filename and path of "job1/page1/welcome.class" 215.

In accordance with the present invention, a programmer or group of programmers working within workspace "job1", upon previewing the page with a browser, are served the class files "index.class" 217 and "contents.class" 219 loaded from the base or root location, while at the same time the modified "welcome.class" file designated "job1/page1/welcome.class" 215 is served to the browser working within "job1", as shown in FIG. 2a. Other users not working within "job1" (e.g., those working within a workspace designated "job2") are served the same "index.class" and "contents.class" files, but would be served the "welcome.class" file contained in the base location. The files served to a user working outside of workspace "job1" are shown in FIG. 2b (i.e., "base/index.class" 217, "base/page1/contents.class" 219, "base/page1/welcome.class" 225).

Figure 3B:
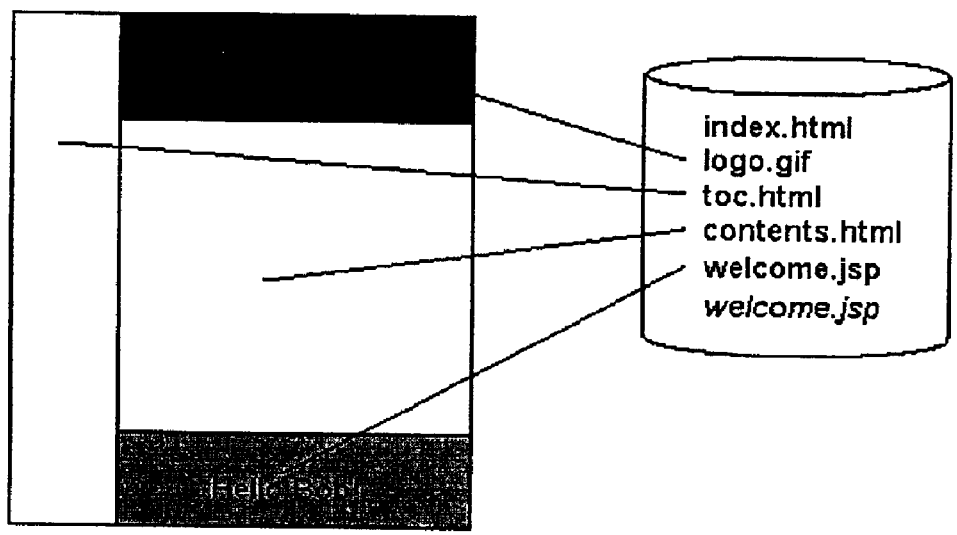
FIG. 3b is a browser view of the web page as seen by a programmer working outside of the sample workspace.

The resulting page previews as viewed by browsers operating in separate workspaces are shown in FIG. 3a and FIG. 3b. Users previewing from two separate workspaces would see different site previews. Users viewing the site from workspace "job1" or workspace "job2" view the same "index.class" and "contents.class" files based on the root or base location. However, the "welcome.class" file differs between the respective workspaces. This causes users in workspace "job1" to view the page with the welcome message controlled by "job1/page1/welcome.class" displaying the casual greeting "Hello Bob!" (as shown in FIG. 3a), while users in workspace "job2" view the page with the welcome message controlled by a file with a class filename generated for workspace "job2" using the base location, for example "base/page1/welcome.class" displaying the original, more formal, welcome message "Welcome, Robert" (as shown in FIG. 3b).

When the changes to "welcome.jsp" in workspace "job1" are complete, and approved by the appropriate supervisory personnel if required, the web content management software in accordance with the present invention promotes the file from workspace "job1" to the base or root location. The first subsequent reference to "welcome.jsp" then automatically causes the revised "welcome.jsp" to be recompiled into "base/page1/welcome.class", thereby allowing all requests for "welcome.jsp" to view the edited version. At this point, the class files contained within workspace "job1" are deleted. If no further work is to be performed in workspace "job1", it is removed and the space freed for subsequent workspace assignment.

The same process is used for a JSP in a workspace that calls another JSP (e.g., Java bean) from within the first JSP, for example, using a <jsp:include> command. The JSP servlet creates a specific class filename for the included JSP in the same manner as described above. This allows for the included JSP to be called from another workspace or from another JSP running independent from the JSP file under construction in the initial workspace.

File serving in accordance with the present invention provides a means for programmers to edit active web content on web sites without having to disable the file under construction. It enables the editing to be completed using the workspace concept, which also allows for an organizational structure to be applied to the editing process (i.e., supervisory personnel can approve the edits before the file is promoted). This provides significant advantages in web content management, as it allows active content to be managed in a manner previously limited to static content.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

I claim:

1. A computer-implemented method for web content management, comprising the steps of:
   (a) selecting at least one dynamic content file from a web site, said web site comprising a plurality of files, each of said plurality of files being stored in a respective storage location;
   (b) placing a copy of said dynamic content file in a workspace, said workspace providing a respective storage location different from said respective storage location of said dynamic content file, said copy being editable within said workspace;
   (c) enabling a first version of said web site to be viewed from within said workspace, said first version including a display of said copy stored within said workspace in conjunction with all other files on said web site, said other files being stored in respective storage locations outside of said workspace;
   (d) while permitting said first version to be viewed from within said workspace, enabling a second version of said web site to be viewed from outside said workspace, said second version including a display of said dynamic content in conjunction with all other files on said web site, said other files being stored in respective storage locations outside of said workspace; and wherein said dynamic file is a Java Server Pace.

2. A method as set forth in claim 1, wherein step (c) comprises at least the steps of:
   (d) editing said copy of said file to create an edited version of said copy;
   (e) viewing said edited version of said copy stored within said workspace in conjunction with all other files on said web site stored outside of said workspace.

3. A method as set forth in claim 2, wherein step (c) further comprises the steps of:
   (f) replacing said dynamic content file on said web site with said edited version of said copy.

4. A method as set forth in claim 1, wherein step (c) comprises at least the steps of:
   (d) compiling said Java Sewer Page into a Java class within said workspace;
   (e) if said Java Server Pane is stored within said workspace, assigning to said Java class a class name that references said workspace, said class name being for use within said workspace; and (f) if said Java Sewer Page is not stored within said workspace, assigning to said Java class a class name that references a base path storage location of said Java Server Page, said class name being for use within said workspace.

5. A method as set forth in claim 1, wherein said web site uses a database file structure.

6. A computer program product for web content management, said computer program product comprising a computer readable storage medium having computer program logic recorded thereon for:

(a) selecting at least one dynamic content file from a web site, said web site comprising a plurality of files, each of said plurality of files being stored in a respective storage location;

(b) creating a copy of said file;

(c) placing said copy in a workspace, said workspace providing a respective storage location different from said respective storage location of said dynamic content file, said copy being editable within said workspace;

(d) enabling contents of said copy to be viewed from within said workspace in conjunction with all other files on the web site, said other files being stored in respective storage locations outside of said workspace;

(e) enabling contents of said dynamic content file to be viewed from outside said workspace in conjunction with all other files on said web site, said other files being stored in respective storage locations outside of said workspace;

and wherein said dynamic file is a Java Server Page.

7. A computer program product as set forth in claim 6, further comprising:

(f) editing said copy In said workspace to create an edited version of said copy;

(g) displaying contents of the edited version of said copy in conjunction with all other files on said web site to users within said workspace.

8. A computer program product as set forth in claims 7, further comprising computer executable instructions for replacing said dynamic content file on said web site with said edited version of said copy.

9. A system for web content management on a web site containing a plurality of files structured to support a workspace configuration, comprising:

a microprocessor:

memory:

computer executable instructions;

a JSP;

at least one workspace;

a servlet, wherein said servlet performs the steps of claim 1 and provides for said JSP to be viewed within said workspace in conjunction with all other files on said web site, said other files not being stored within said workspace, said JSP being viewable by a browser operating in said workspace, while simultaneously allowing said JSP to be viewed In conjunction with all other files on said web site by a browser operating outside of said workspace.

10. A system as set forth in claim 9, wherein said servlet further provides for the following:

editing of said JSP in said workspace to create an edited version;

viewing of edited version of said JSP in conjunction with all other files on said web site by a browser operation in said workspace.

11. A system as set forth in claim 10, wherein said servlet, in response to a request from a browser in a workspace, is further used to perform the following:

compile said JSP into a class file;

generate a class filename including an identification of said workspace;

load said file into a class loader;

invoke said class file from said class loader upon request from a browser operating in said workspace.

12. A system as set forth in claim 11, wherein said servlet invokes said JSP in said workspace and outside of said workspace simultaneously.

13. A system as set forth in claim 12, wherein said JSP on said web site is replaced by said edited version of said JSP from said workspace.

* * * * *

UNITED STATES PATENT AND TRADEMARK OFFICE
CERTIFICATE OF CORRECTION

PATENT NO. : 6,993,713 B2 Page 1 of 1
DATED : January 31, 2006
INVENTOR(S) : Wendt It is certified that error appears in the above-identified patent and that said Letters Patent is hereby corrected as shown below:

Column 6,
Line 47, change "Pace" to -- Page --.
Line 62, change "Sewer" to -- Server --.
Line 64, change "Pane" to -- Page --.

Column 7,
Line 1, change "Sewer" to -- Server --.
Line 39, change "claims" to -- claim --.

Signed and Sealed this

Sixth Day of June, 2006

JON W. DUDAS
*Director of the United States Patent and Trademark Office*